April 7, 1925.
W. HOHMANN
1,532,747
APPARATUS FOR SPLICING FILMS
Filed Feb. 17, 1923
2 Sheets-Sheet 1

Inventor
Wilhelm Hohmann

April 7, 1925. 1,532,747
W. HOHMANN
APPARATUS FOR SPLICING FILMS
Filed Feb. 17, 1923 2 Sheets-Sheet 2
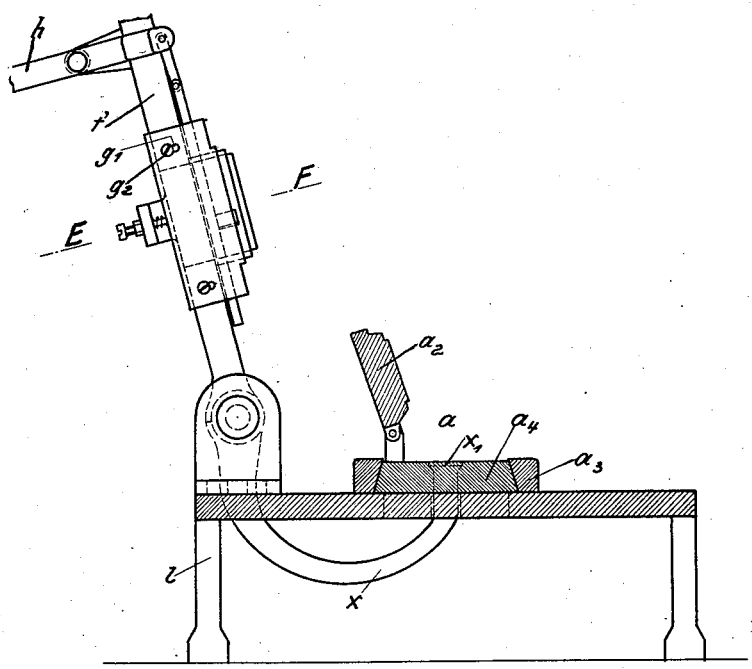
Fig. 3 C-D
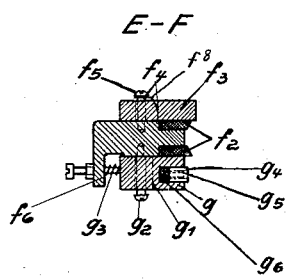
Fig. 4

Patented Apr. 7, 1925.

1,532,747

UNITED STATES PATENT OFFICE.

WILHELM HOHMANN, OF DELITZSCH, NEAR HALLE, GERMANY, ASSIGNOR TO ACTIEN GESELLSCHAFT FÜR ANILIN FABRIKATION, OF BERLIN, GERMANY.

APPARATUS FOR SPLICING FILMS.

Application filed February 17, 1923. Serial No. 619,729.

*To all whom it may concern:*

Be it known that I, WILHELM HOHMANN, a citizen of the German Republic, residing at Delitzsch, near Halle, Germany, have invented certain new and useful Improvements in Apparatus for Splicing Films, of which the following is a specification.

It is often desirable to remove thin coatings as strips from their base. Especially in the process of splicing films the removal of the photographic layer from the end of one of the films constitutes the most important part of the operation. Up to the present time this has been done mostly by hand by first moistening the gelatinous layer and then shaving it off with a knife. This method is inherently slow and tedious and is productive of more or less useful results only when carried out by skilled operators.

Various machines have been constructed for simplifying the removal of the photographic layer, such machines being based upon the operation of rotating elements of attrition. The removal of the photographic layer in such cases is effected by movement of the tool and the film relatively to one another lengthwise of the film whereby either the tool or the film may be stationary. In other cases movement is given to the tool transversely of the film.

The first of the two forms mentioned has not been favorably received because removal of the upper layer along a sharply defined plane of separation could not be carried out at the end of the film. With rotary tools no uniformly clean scraping can be obtained so that a smooth joining fit of the pictures is practically impossible which in turn affects the adhesive strength and resistivity of the joint after adhesive connection. Even with scrapers mounted to move in a single plane a uniform removal of the layer has not been feasible for the reason that inasmuch as the apparatus is seated upon the film, either too much or too little of the layer is removed, according to the pressure.

Devices in which the tool moves transversely of the film have the disadvantage that it is necessary to repeat the operation a number of times in order to completely remove the emulsion, since it is not possible, in the absence of a sufficient clamping action, to exert upon the free end of the film an excessive lateral pressure without injuring the film.

To eliminate this disadvantage is an object of the invention.

The invention is based upon the conception that the layer of emulsion may be safely removed in a simple manner when the film is securely clamped to a support at both sides of the area to be removed. It is then practically possible to bring a planer into operation in a direction transversely of the film in such a manner that the layer may be removed in the form of a shaving by a single stroke of the tool. Since the film, secured to its support in that manner can withstand a considerable lateral pressure, the emulsion may be removed in dry condition and the tedious and painstaking step of moistening may be omitted. The whole process of removing the emulsion according to the invention is exceedingly simple and is carried out automatically without special attention.

The planing device is preferably made a part of a film-pasting machine which carries out the joining process in toto. Machines of this type are generally not new. The film or both film ends in such machines are clamped in two clamping devices prior to further treatment. When these clamping devices are stationary, as is the case in connection with some of the known constructions, at least one of them must be opened during the pasting operation and must be closed again after the film has been placed in the proper position for pasting, which is of course a considerable disadvantage. For this reason clamping devices have been movably arranged to facilitate the movement of the film ends toward each other without taking them out of the clamping mechanism. However, inasmuch as still other movements of the clamping mechanism are necessary for the operation e. g. the movement of the film forth and back to permit the removal of the emulsion, the whole mechanism is bound to be extremely complicated.

In the splicing machine evolved according to the invention, the problem of moving the film has been solved in simple manner by making only one of the clamping elements horizontally movable, the salient feature being a lever and translating mechanism for making the clamp operative in three different positions in accordance with the sequence of the steps in the pasting process as a whole.

For a full understanding of the invention, reference is made to the accompanying drawings in which Fig. 1 is an elevation of an arrangement embodying the invention;

Fig. 3 is a vertical section on line C—D Fig. 1;

Fig. 4 is a section on line E—F, Fig. 3.

Figure 1:
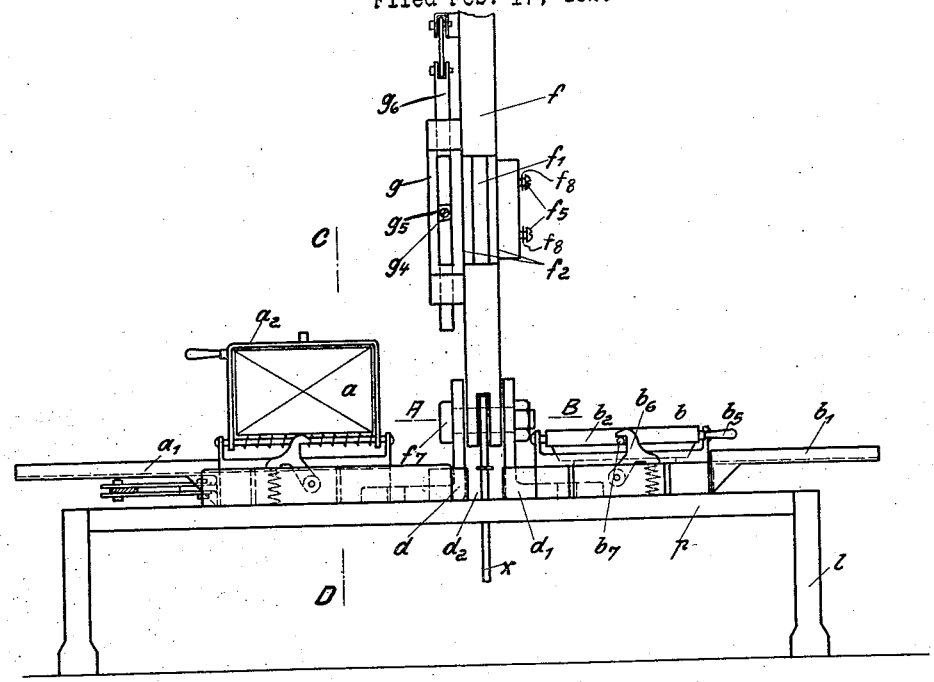
Figure 2:
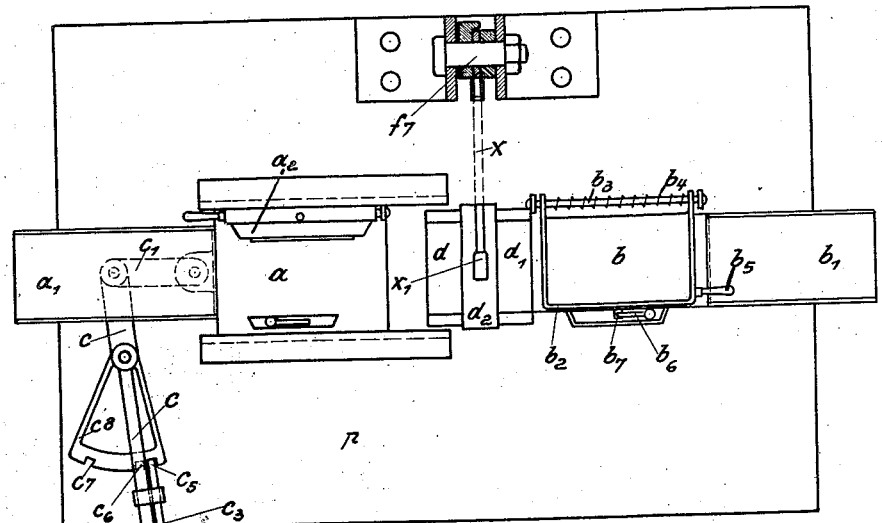
Fig. 2 is a plan view thereof, with a partial section on line A—B.

The operating mechanism is supported upon a platform $p$ carried upon legs 1. The operating mechanism comprises principally a movable clamping device $a$, a stationary clamping device $b$, a cutter $f$, a planer $g$ a table $d$, $d_1$ and various translating mechanism.

The stationary clamping device $b$ includes a stationary support $b_1$ for a film and a clamping element $b_2$ angularly movable on a hinge $b_3$. While the particular detail arrangement may assume different forms, I prefer to provide a spring $b_4$ adapted to normally hold the element $b_2$ in open position. A handle portion $b_5$ may be applied for pressing the element $b_2$ against the support $b_1$ against the tension of the spring. A spring-actuated latch $b_6$ pivotally mounted on the support may be brought into engagement with a pin $b_7$ on the element $b_2$ to hold the latter in clamping position.

The clamping device $a$ is substantially like the clamping device $b$, the description of which applies in every detail. The element $a_2$ may be clamped against the support $a_1$ and the clamping device including the slide piece $a_4$, as a whole is movable in the undercut slide way $a_3$. A lever $c$, pivotally mounted on the platform $p$ and connected with the slide piece $a_4$ by means of the member $c_1$, may be used for moving it in the different positions. A blocking device $c_3$ with a spring-actuated latch $c_4$ and pivotally connected to the handle portion $c_2$ by suitable mechanism successively may be brought into engagement with three stops $c_5$, $c_6$, $c_7$ of the sector $c_8$.

Intermediate the two clamping devices is disposed a table composed of two parts $d$ and $d_1$ separated from each other by a gap $d_2$.

At one side of the platform $p$ is pivotally mounted a lever $f$ carrying a cutter $f_1$, having preferably two cutting edges $f_2$. To the lever $f$ on opposite sides thereof are attached a planer $g$ and a clamping member $f_3$ respectively. Both the planer $g$ and the element $f_3$ are movable relatively to the lever $f$. The element $f_3$ has two slots $f_4$ occupied by screws $f_5$ which are secured in the lever $f$. This arrangement affords movement of the clamping member $f_3$ relatively to the lever $f$. By suitable spring means between the lever $f$ and the clamping member $f_3$ the latter may be yieldingly held in the position shown in Fig. 4. While there is considerable latitude in this respect, the arrangement may include two leaf springs $f_8$ each of which has a washer portion for the reception of a pin $f_5$ while the ends bear resiliently upon the bottom of the slots $f_4$. The planer has slots $g_1$ occupied by screws $g_2$. The lever has an overhanging portion $f_6$ supporting a spring $g_3$ which tends to press the planer $g$ inwardly and away from the portion $f_6$. The lever $f$ also carries a lever $h$ pivotally connected thereto by means of which the planing blade $g_4$, fastened with a screw $g_5$ on the rod $g_6$, can be reciprocated.

The pin $f_7$ of the lever carries the curved branch $x$ finishing in the plane $x_1$ which may furnish an auxiliary support between the portions $d$ and $d_1$ of the table, the lever $f$ being in an elevated position as drawn in Figure 3.

The process of uniting two pieces of film is carried out as follows:

The two films are placed into the clamping sets $a$ and $b$, the photographic layers facing upwardly, and are securely clamped by closing the elements $a_2$ and $b_2$. The clamping set $a$, at the left, blocked in the position $c_5$, is at that time at its greatest distance from the set $b$ and by pressing the lever $f$ downwardly the film ends are cut smooth. At the same time the planer presses upon the left film end on both sides of the planer blade $g_4$. While the lever $f$ is in depressed position the small auxiliary lever $h$ and thereby the planer blade $g_4$ may be actuated effecting the removal of the desired width of the photographic layer from the end of the film at the left. Between the left cutter knife $f_2$ and the planer blade $g_4$, i. e. at the very end of the left film, there is thus left a narrow strip from which the photographic layer has not been removed. Now the lever $f$ will be slightly raised and the clamp at the left is moved nearer to the plate $d$ by angular movement of the lever $c$ to the position $c_6$. This movement of the lever $c$ and the clamp $a$ is such that the right hand end of the portion from which the photographic layer has been planed off comes exactly under the left cutter knife $f_2$. By again pressing down the lever $f$, the unshaved end portion of the left film which still carries the photographic emulsion is cut off. In this position the upper surface of the portion from which the layer has been removed is coated with an adhesive, either by hand or by any suitable contrivance associated with the lever $f$, and by further movement of the lever $c$ to its final position $c_7$ to the left, the left film is moved to the right under the end of the right film into a position where the previously cut end of the right film is exactly in alignment with the inner end of the coated portion. When the lever $f$ is raised, the ends of the films, due to their accustomed position on a reel, have a tendency to curve inwardly which is upwardly in the operation of the device described. This tendency is more pronounced in the case of the right film which is not coated than in the case of the left film carrying the adhesive coat. During movement of the left film to the right, its end will thus readily pass under the upwardly curved end of the right film. When the end of the right film is now pressed upon the coated portion of the left by means of the clamping member $f_3$, connected to the lever $f$, the film ends are accurately joined as intended. The clamping member like the planer may be spring-pressed as previously mentioned. To press the two film ends together, it is merely necessary to moderately press the lever $f$ upon the table. As is indicated in Fig. 4, the clamping member $f_3$ normally projects beyond the edges of the cutter knives. By gently pressing down upon lever $f$ in order not to squeeze out the adhesive from between the film ends, there is no danger of again cutting the films. Like in most machines, the operation is routine work, the details of which are a matter of habit.

The adhesive connection may be accelerated by heating the pressure plate $f_3$ if found necessary or advisable. When the elements $a_2$ and $b_2$ of the clamping sets are now released and the lever $f$ is raised, the spliced film may be taken from the apparatus.

In the foregoing reference has been made only to a single embodiment of the invention. It is understood, of course, that within the scope of the disclosure numerous changes and modifications may be made by persons skilled in the art. The disclosure is intended merely as an illustration of the general principle of operation on which the invention is based, although the form disclosed represents what is considered as a preferred embodiment thereof.

I claim:—

1. Apparatus for removing from a film a portion of the photographic layer comprising means for clamping the film along substantially parallel lines transversely thereof on opposite sides of and immediately adjacent to the portion to be removed, a planing tool and means associated with the clamping means for guiding the tool transversely over the clamped portion to cause removal of the photographic layer.

2. Apparatus of the character described, comprising means for supporting a film in a plane, a planing tool movable transversely of the film and means associated with the planing tool on both sides thereof for clamping the film upon its support and means for moving the film in the direction of its length.

3. In apparatus of the character described, the combination with a table, of means for moving a film in the direction of its length upon the table, a planing tool movable transversely of the film for removing a strip of the photographic layer thereof, means for moving the planing tool into and out of operative position, means for clamping the film upon the table immediately adjacent the planing tool on both sides thereof and cutter mechanism disposed for movement transversely of the path of movement of the film.

4. In apparatus of the character described, the combination with a table, of means for moving a film in the direction of its length upon the table, a planing tool, means associated with the planing tool on both sides thereof for clamping the film upon the table, means for moving the planing tool and the clamping means into operative position transversely of the film and means for actuating the planing tool.

5. Apparatus according to claim 4 including a cutter mechanism disposed for movement transversely of the path of movement of the film.

6. In apparatus of the character described, the combination with a table, of clamping means on opposite sides thereof for holding two films in alignment with each other, means for moving one of said clamping means in the direction of the length of the films toward the other clamping means, a planing tool movable toward and away from the table transversely of the films, means associated with the planing tool on both sides thereof for clamping a film upon the table and cutter mechanism disposed above the table for cutting movement parallel to the movement of the planing tool.

7. In apparatus of the class described, the combination with a table, of clamping means on opposite sides thereof for holding two films in alignment with each other, means for moving one of said clamping means in the direction of the length of the films toward the other clamping means, a lever pivotally movable toward and away from the table transversely to the films, said lever carrying a planing tool including means on both sides thereof for clamping a film upon the table and means for actuating the planing tool.

8. In apparatus of the class described, the combination with a table, of clamping means on opposite sides thereof for holding two films in alignment with each other, means for moving one of said clamping means in the direction of the length of the films toward the other clamping means, a lever pivotally movable toward and away from the table transversely to the films, said lever carrying a planing tool including means on both sides thereof for clamping a film upon the table, means for actuating the planing tool, and cutter mechanism adjacent the planing tool and parallel thereto.

9. In apparatus of the class described, the combination with a table, of clamping means on opposite sides thereof for holding two films in alignment with each other, means for moving one of said clamping means in the direction of the length of the films toward the other clamping means, a lever pivotally movable toward and away from the table transversely to the films, said lever carrying a planing tool including means on both sides thereof for clamping a film upon the table, means for actuating the planing tool, and cutter mechanism adjacent the planing tool and parallel thereto, the planing tool and the cutter mechanism being so disposed that the film is cut before the planing tool comes into operative position for planing.

10. In apparatus of the class described, the combination with a table, of clamping means on opposite sides thereof for holding two films in alignment with each other, means for moving one of said clamping means in the direction of the length of the films toward the other clamping means, a lever pivotally movable toward and away from the table transversely to the films, said lever carrying a planing tool including means on both sides thereof for clamping a film upon the table, means for actuating the planing tool, cutter mechanism adjacent the planing tool and parallel thereto and a clamp adjacent the cutter, said clamp being movable relatively to the cutter mechanism and parallel thereto and being disposed to make contact with a film in advance of the cutter mechanism and the planing tool and the cutter mechanism being so disposed that the film is cut before the planing tool comes into operative position for planing.

11. In apparatus of the class described, the combination with a table, of a lever pivotally movable toward and away from the table, said lever carrying a planing tool and a cutter blade, the planing tool being movable relatively to the cutter blade parallel thereto.

12. Apparatus according to claim 11 including means at both sides of the planing tool for clamping a film upon the table and for determining the depth of the cut of the planing tool.

13. In apparatus of the class described, the combination with a table, of a lever pivotally movable toward and away from the table, said lever carrying a planing tool and a cutter blade, the planing tool being movable relatively to the cutter blade parallel thereto, means at both sides of the planing tool for clamping a film upon the table and for determining the depth of the cut of the planing tool, the planing tool and the clamping means having a limited movement as a unit relatively to the cutter edge toward and away from the table and including spring means disposed to resist such relative movement of the planing tool and clamping means away from the table.

14. In apparatus of the class described, the combination with a table, of a lever pivotally movable toward and away from the table, said lever carrying a planing tool and a cutter blade, the planing tool being movable relatively to the cutter blade parallel thereto, means at both sides of the planing tool for clamping a film upon the table and for determining the depth of the cut of the planing tool, a member on the lever for pressing upon a film, the planing tool and the said member being disposed on opposite sides of the cutter blade, means for movably supporting the said member relatively to the cutter blade in a direction toward and away from the table and resisting such relative movement of the pressing member away from the table, the relation being such that the said member normally projects beyond the edge of the cutter blade toward the table.

15. In apparatus of the class described, the combination with a table, of a lever pivotally movable toward and away from the table, said lever carrying a cutter mechanism and a planing tool and a pressing member on opposite sides of the cutter mechanism, the said member normally projecting beyond the effective part of the cutter mechanism.

16. Apparatus according to claim 15 in which the cutter mechanism has two cutting edges in parallel spaced relation.

In testimony whereof, I affix my signature.

WILHELM HOHMANN.